United States Patent
Matsui

[11] Patent Number: 5,852,595
[45] Date of Patent: Dec. 22, 1998

[54] DEVICE FOR INITIALIZING AN OPTICAL DISC

[75] Inventor: Tsutomu Matsui, Tokyo, Japan

[73] Assignee: NEC Corporation, Tokyo, Japan

[21] Appl. No.: 845,788

[22] Filed: Apr. 25, 1997

[30] Foreign Application Priority Data

Apr. 26, 1996 [JP] Japan ..................... 8-107610

[51] Int. Cl.$^6$ ..................... G11B 7/00
[52] U.S. Cl. ............ 369/116; 369/112; 369/44.37; 369/32
[58] Field of Search ............... 369/116, 120, 369/112, 13, 44.23, 44.37, 32

[56] References Cited

U.S. PATENT DOCUMENTS 5,206,843  4/1993  Kabburagi .................. 369/13
5,319,619  6/1994  Shindo et al. .............. 369/13

FOREIGN PATENT DOCUMENTS 63-222350  9/1988  Japan.
4-271019   9/1992  Japan.

*Primary Examiner*—Nabil Hindi
*Attorney, Agent, or Firm*—Ostrolenk, Faber, Gerb & Soffen, LLP

[57] ABSTRACT

A device capable of initializing an optical disc in high-speed and accurate manner includes a moving table (106) movable in the radius direction of a optical disc (101) to which first and second photo head moving sections (107) and (108) are fixed. A laser beam (131) emitted from a fixed section (105) is branched into two erasing beams through a beam splitter (136) and a reflection mirror (138), and the erasing beams are irradiated on the optical disc (101) from respective objective lenses (142) and (152). The erasing beam are of sizes that can erase a plurality of tracks simultaneously. The moving table (106) advances by a plurality of tracks to thereby initialize the plurality of tracks at once.

7 Claims, 7 Drawing Sheets

($\lambda = 830 \mu m$)

DEVICE FOR INITIALIZING AN OPTICAL DISC

BACKGROUND OF THE INVENTION

1. Field of the Invention

The present invention relates to a device for initializing a rewritable disc such as a magneto-optical disc and a phase change magnetic disc.

2. Description of the Related Art

Researches have been made with rapid progress into an external storage unit that satisfies both two conditions of a high-speed access property of a magnetic disc for a computer and a large storage capacity of an optical disc. The coming-generation external storage unit will enable a high-speed random access at a high-speed transfer rate, and be large in capacity and excellent in the shelf life of the medium. The optical discs which satisfy the above conditions and are characterized by the durability of the medium due to non-contact are most promising as the coming-generation external storage unit.

FIG. 9 shows the cross-sectional structure of a conventional magneto-optical optical disc for a magneto-optical medium. In the figure, a magneto-optical optical disc 300 is structured in such a manner that tracks are formed on a substrate 301 made of polycarbonate, etc., and pre-grooves 302 for tracking are formed in the tracks. A recording film 303 is formed so as to be interposed between protective films 3041 and 3042, and a reflection film 305 is formed on the upper protective film 304, to bring the recording film 303 to an enhancement effect.

FIG. 10 shows the principle of the structure of the device for initializing the magneto-optical optical disc shown in FIG. 9. This technique is disclosed in Japanese Patent Unexamined Publication No. Sho 63(1988)-222350. The magneto-optical optical disc 300 is mounted on a magnet 311 and heated using a powerful light source 312 such as a Xenon lamp. A mirror 313 is used to convert a light beam emitted from the light source 312 into a parallel light beam and to irradiate it onto the magneto-optical optical disc 300. The magneto-optical optical disc 300 is heated by the irradiation of the light beam from the light source 312, and when its temperature rises to Curie temperature or higher, a next direction is set to a direction of an external magnet so that the entire magneto-optical optical disc 300 is initialized.

FIG. 11 shows the principle of the structure of the device for initializing the optical disc which has been proposed to improve the efficiency of initialization. This technique is disclosed in Japanese Patent Unexamined Publication No. Hei 4(1992)-271019. In the case of conducting a normal initialization, a parallel light beam is made incident to an objective lens 351 from a laser light source or a powerful light source such as a Xenon lamp not shown. Then, an incident beam 352 is irradiated substantially vertically onto a phase change disc 353 and converged thereon.

On the contrary, in order to improve the efficiency of initialization, an inclined incident beam 354 is used to be converged on the phase change disc 356 through an objective lens 355. $\theta_1$ (=90 degrees) and $\theta_2$ represent the inclinations of incident beams by the respective objective lenses 351 and 355. It should be noted that the phase change disc 356 is the same film formation structure as the magneto-optical optical disc 300 shown in FIG. 9, and the phase change disc 356 is different from the magneto-optical optical disc 300 in that the magneto-optical film of the recording film 303 (FIG. 9) is replaced by a phase change film.

FIG. 12 shows the shapes of the normal incident beam and the obliquely inclined incident beam shown in FIG. 11, which have been irradiated on a disc surface. A spot 357 formed by the normal incident beam 352 (FIG. 11) is circular whereas a spot 358 formed by the inclined incident beam 354 (FIG. 11) is oval. In FIG. 12, parallel lines on the phase change disc 356 represent a track 359, respectively.

FIG. 13 shows temperature rising characteristics of the normal incident beam and the inclined incident beam. A first curve 361 is obtained by the normal incident beam 352 in FIG. 11, and a second curve 362 is obtained by the inclined incident beam 354 in the figure. There are found the advantages that the incident beam 354 indicated by the second curve 362 is gentler in the rising slope of temperature than the incident beam 352, and the use of the phase change disc 356 (FIG. 11) allows the efficiency of erasing to improve.

However, the conventional device for initializing the optical disc as described above suffers from the problems stated below.

(1) First, in case of the device for initializing the optical disc shown in FIG. 10, an area on which a light beam such as a laser beam is irradiated is large. Hence, a plastic disc substrate could take a risk which constitutes to rise up a temperature, and could be deformed.

(2) Also, in the above conventional devices for initializing the optical disc, it is required that the set value of a power necessary for initializing the optical disc is obtained in accordance with the temperature rising conditions per a unit area. Hence, there arises such a problem that the initializing conditions cannot be always accurately calculated.

(3) Further, in the device that conducts erasing by use of the inclined incident beam 354 shown in FIGS. 11 to 13, although the efficiency of erasing is enhanced, the spot 358 of the light beam is increased in diameter as shown in FIG. 12. This leads to such a problem that it is impossible to obtain a sufficient convergent light beam for erasing on each track so that tracking servo is unstabilized, thereby disenabling stabilized erasing operation.

SUMMARY OF THE INVENTION

The present invention has been made to eliminate the above problems with the conventional device, and therefore an object of the present invention is to provide a device for initializing an optical disc, which is capable of initializing a magneto-optical optical disc or a phase change optical disc stably and at a high speed.

In order to solve the above problems, according to the present invention, there is provided a device for initializing an optical disc, comprising: a plurality of erasing beam irradiating means for irradiating a relatively large beam onto a plurality of tracks at different positions on the optical disc simultaneously to erase information written at once; moving means for moving the plurality of erasing beam irradiating means in the radius direction of the optical disc under a condition where erasing beams irradiated from the plurality of erasing beam irradiating means are irradiated onto the optical disc at given intervals; and multi-tracking control means for controlling the moving means to move the erasing beam irradiating means in the radius direction of the optical disc such that the erasing beam irradiating means erases a certain number of tracks, that are erased at once, every time the plurality of erasing beam irradiating means erase all of information in subject tracks of the optical disc.

In the present invention, the plurality of the erasing beam irradiating means irradiate the relatively large spots such as oval spots with a larger diameter in the radius direction of the optical disc or circular spots relatively large in diameter, onto a plurality of positions of the optical disc, simultaneously. Then, every time the plurality of erasing beam irradiating means erase all of the information in the subject tracks of the optical disc, that is, every time the optical disc makes one rotation at the minimum, the number of tracks whose information can be erased at once by the respective erasing beam irradiating means, or a given plurality of tracks which are less than that number are jumped, and the moving means is stepped radically of the optical disc, to thereby use the plurality of erasing beams simultaneously. In addition, because the width of the beams is large, the magneto-optical optical disc or the phase change optical disc is initialized stably and at a high speed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE EMBODIMENT

Now, a description will be given in more detail of preferred embodiments of the present invention with reference to the accompanying drawings.

Figure 1:
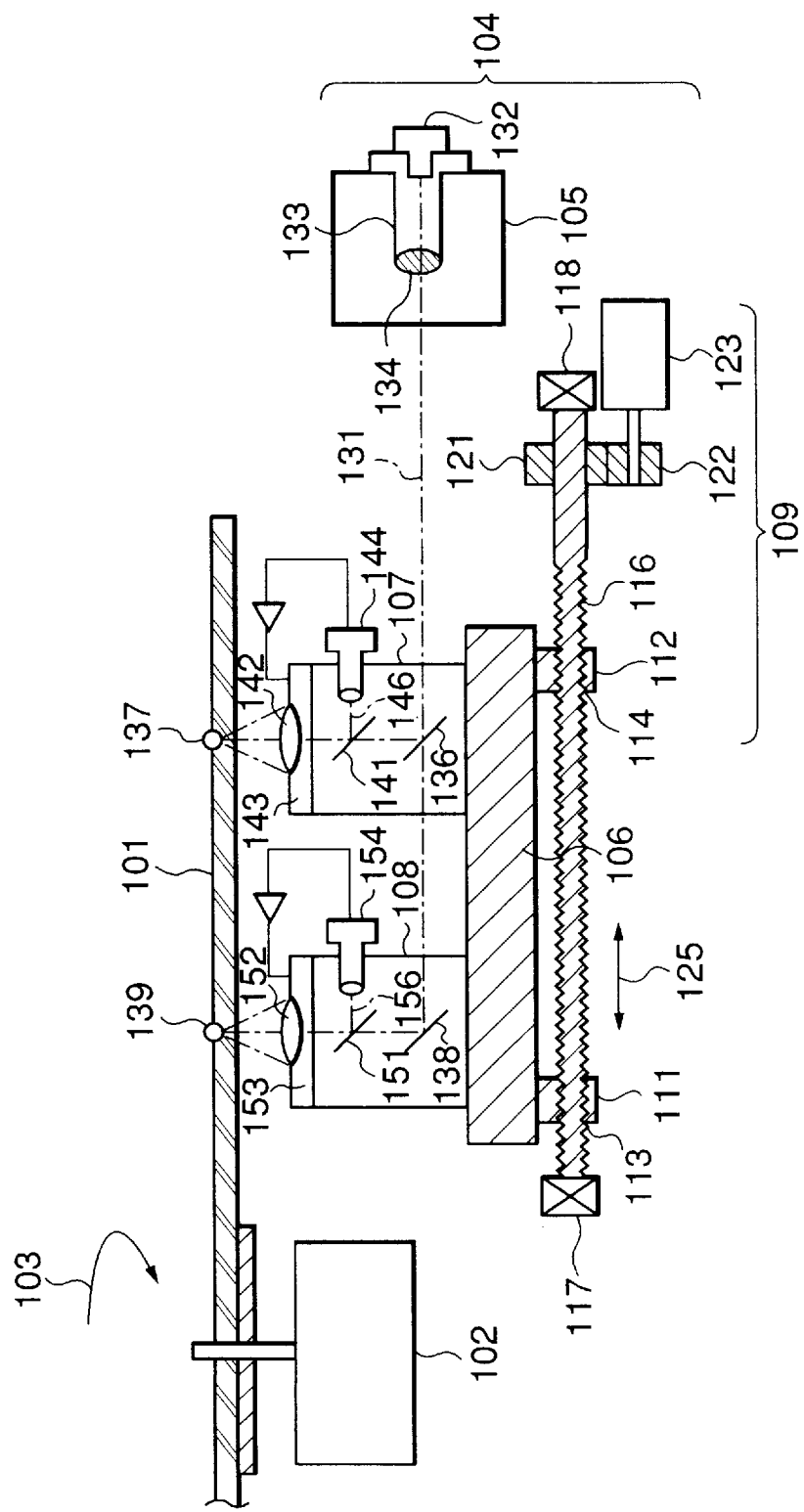
FIG. 1 is a side view showing a device for initializing an optical disc in accordance with an embodiment of the present invention.

FIG. 1 is a side view showing a main portion of a device for initializing an optical disc in accordance with an embodiment of the present invention. The device is so designed that an optical disc 101 consisting of a magneto-optical optical disc or a phase change optical disc is fitted to a rotating shaft of a disc motor 102 so that a disc surface disposed vertically is rotated as indicated by an arrow 103. An optical head 104 for writing, reading or erasing data with respect to the optical disc 102 is disposed below the optical disc 102.

The optical head 104 includes a fixed section 105 which is fixed at a position apart from the disc motor 102 by a predetermined distance toward the right side of the figure, first and second optical head moving sections 107 and 108 mounted on a moving table 106 which is disposed movably in the radius direction of the optical disc 101, and a moving mechanism 109 for moving the moving table 106. In this figure, the moving table 106 is moved in the radius direction of the optical disc while the first and second optical head moving sections 107 and 108 are focussed on the optical disc 101, and thereby the device can initialize the entire surface of the optical disc.

In this embodiment, the moving mechanism 109 is made up of internal threads 113 and 114 which are threaded inside of projections 111 and 112 so as be transverse to the projections 111 and 112 disposed on the bottom of the moving table 106, a bar-shaped member 116 having an external thread screwed with the internal threads 113 and 114, a pair of bearings 117 and 118 that support both ends of the bar-shaped member 116, a first spur gear 121 fixed to a base side of the bar-shaped member 116, a second spur gear 122 engaged with the first spur gear 121, and a drive motor 123 fixed to the second spur gear 122 at its rotating shaft. The bar-shaped member 116 is disposed along a radius direction of the optical disc 101, and the drive motor 123 is made up of, for example, a stepping motor or a DC (direct current) motor. Upon rotating the drive motor 123 forwardly or reversely, the moving table 106 is allowed to move in a direction denoted by an arrow 125 which is the radius direction of the optical disc 101.

The fixed section 105 is so designed that a first laser beam 131 is emitted therefrom in parallel to the axis of the moving table 106. A laser pen 133 containing a laser 132 therein is disposed on the optical head fixing section 105, and a laser beam emitted from the laser pen 133 is collimated by a collimator lens 134 into a first laser beam 131. In this embodiment, the first laser beam 131 is 830 nm in wavelength $\lambda_1$ and 50 mW in its output.

The first optical head moving section 107 has a beam splitter 136 in the vicinity of its bottom, which splits the first laser beam 131 into a beam obtained by deflecting the first laser beam 131 by 90 degrees and a beam straightly progressing. The former beam is focused on a first focusing position 137 of the optical disc 101 as will be described later and follows the track with the movement of the moving table 106 in a state where focusing servo is conducted. The latter beam is made incident to the second optical head moving section 108 and deflected by 90 degrees by a reflection mirror 138 which is disposed in the vicinity of its bottom. Similarly, the latter beam is focused on a second focusing position 139 of the optical disc 101 and follows the track with the movement of the moving table 106 in the state where focusing servo is conducted.

The first laser beam 131 deflected by 90 degrees by the first optical head moving section 107 goes straightly through a dichroic mirror 141 and is made incident to an objective lens 142 so as to be focused on the first focusing position 137. The objective lens 142 is assembled with a two-axial actuator 143 which will be described later. A first hologram optical head unit 144 is disposed on the first optical head moving section 107. The first hologram optical head unit 144 allows a second laser beam 146 emitted therefrom to be deflected by 90 degrees by the dichroic mirror 141 and made incident to the objective lens 142 so as to be focused nearly on the first focusing position 137. Then, a focusing error signal and a tracking error signal are detected, as will be described later, from a light reflected from the first focusing position 137. The second laser beam 146 as used is 780 nm in wavelength $\lambda_2$ which is different from the wavelength $\lambda_1$ of the first laser beam 131.

The first laser beam 131 deflected by 90 degrees by the second optical head moving section 108 goes straightly through a dichroic mirror 151 and is made incident to an objective lens 152 so as to be converged on the second focusing position 139. The objective lens 152 is assembled with a two-axial actuator 153. A second hologram optical head unit 154 is disposed on the second optical head moving section 108. The second hologram optical head unit 154 allows a third laser beam 156 emitted therefrom to be deflected by 90 degrees by the dichroic mirror 151 and made incident to the objective lens 152 so as to be focused nearly on the second focusing position 139. Then, a focusing error signal and a tracking error signal are detected, as was described above, from a light reflected from the second focusing position 139. The third laser beam 156 as used is 780 nm in wavelength $\lambda_2$ which is different from the wavelength $\lambda_1$ of the first laser beam 131.

It should be noted that the output of the second or third laser beam 146 or 156 outputted from the first and second hologram optical head units 144 and 154 is used for erasing and also branched into two outputs with the result that it is remarkably lower than the output of the first laser beam 131 used in the respective optical head moving sections 107 and 108.

Figure 2:
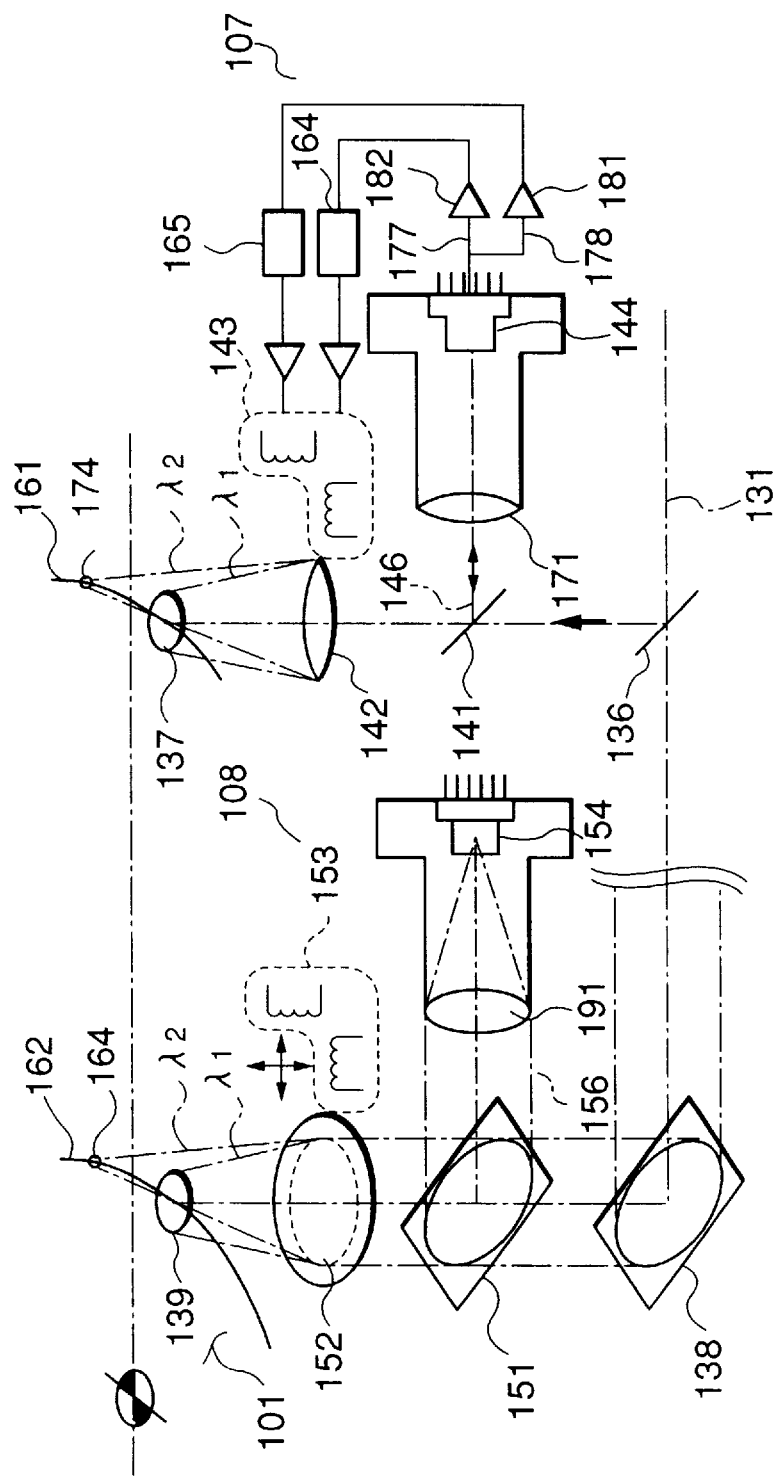
FIG. 2 is a diagram showing main portions of an optical system including first and second optical head moving sections.

FIG. 2 is a diagram showing the main portions of the optical system including the first and second optical head moving sections. In the figure, the laser beam of the first wavelength $\lambda_1$ and the laser beam of the second wavelength $\lambda_2$ outputted from the first optical head moving section 107 are focused on a predetermined track 161 on the optical disc 101, respectively, and a laser beam of the first wavelength $\lambda_1$ and a laser beam of the second wavelength $\lambda_1$ outputted from the second optical head moving section 108 are focused on another track 162 inside of the track 161 on the optical disc 101, respectively.

The focusing and tracking servo operations by the first and second optical head moving sections 107 and 108 are conducted by driving the two-axial objective lens actuators 143 and 153 in response to the focusing error signal and the tracking error signal detected by the corresponding first or second hologram optical head unit 144 or 154, which passes through a servo amplifier 164 or a phase compensating circuit 165 (In FIG. 2, only the first optical head moving section 107 is shown.). This operation will be described in more detail below.

The first optical head moving section 107 allows the first laser beam 131 of the wavelength $\lambda_1$ to be made incident to the objective lens 142 through the beam splitter 136 and the dichroic mirror 141 in the stated order, and to be focused on the first focusing position 137 on the track 161. On the contrary, a divergent light beam of the wavelength $\lambda_2$ emitted from a laser not shown within the first hologram optical head unit 144 is converted into a parallel light beam by a collimator lens 171 and emitted as the second laser beam 146. Then, the second laser beam 146 is deflected by 90 degrees by the dichroic mirror 141 and made incident to the objective lens 142 so as to be focused on a focusing position 174 on the optical disc 101. The laser beam of the wavelength $\lambda_2$ is reflected by the surface of the disc and reversely progressed so as to be made incident to the collimator lens 171 and focused on a multi-divided sensor not shown within the first hologram optical head unit 144. Then, a focusing error signal 177 and a tracking error signal 178 are detected by the output of the sensor and a head amplifier not shown.

The focusing error signal 177 and the tracking error signal 178 are inputted to the servo amplifier 164 and the phase compensating circuit 165 after being amplified by amplifiers 181 and 182, and outputs are inputted to the two-axial objective lens actuator 143. In response to the outputs, the two-axial objective lens actuator 143 drives the objective lens 142 in a focusing direction and a tracking direction.

The same is applied to the second optical head moving section 108, and the first laser beam 131 that has passed through the beam splitter 136 is made incident to the objective lens 152 through the reflection mirror 138 and the dichroic mirror 151 in the stated order, and focused on the first focusing position 139 on the track 162. On the contrary, a divergent light beam of the wavelength $\lambda_2$ emitted from a laser not shown within the second hologram optical head unit 154 is converted into a parallel light beam by a collimator lens 191 and emitted as the second laser beam 156. Then, the second laser beam 156 is deflected by 90 degrees by the dichroic mirror 151 and made incident to the objective lens 152 so as to be focused on a focusing position 194 on the optical disc 101. The laser beam of the wavelength $\lambda_2$ is reflected by the surface of the disc and reversely progressed so as to be made incident to the collimator lens 191 and converged on a multi-divided sensor not shown within the second hologram optical head unit 154. Then, a focusing error signal and a tracking error signal are detected by the output of the sensor and a head amplifier not shown, and inputted to the two-axial objective lens actuator 153 through a servo amplifier and a phase compensating circuit not shown, respectively. The two-axial objective lens actuator 153 drives the objective lens 152 in the focusing direction and the tracking direction in response to those signals.

Figure 3:
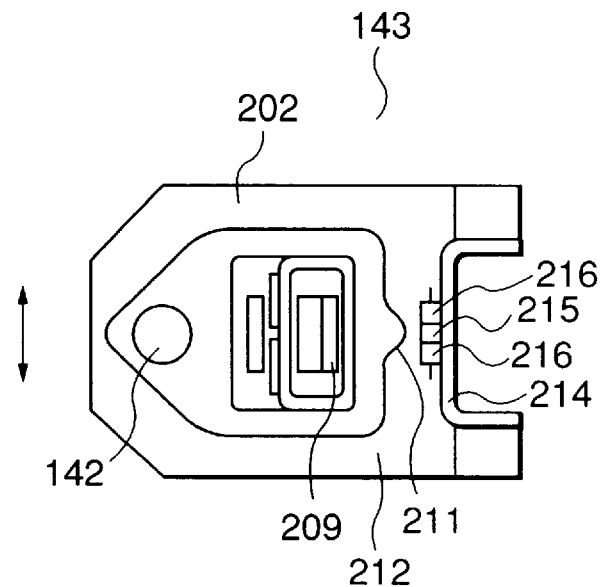
FIG. 3 is a top view showing a two-axial objective lens actuator.
Figure 4:
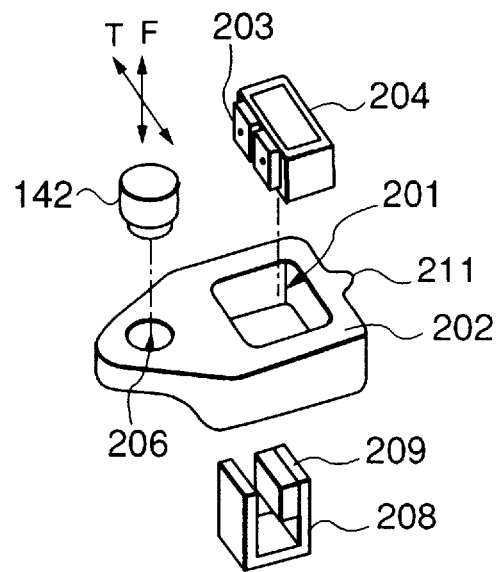
FIG. 4 is an explored view of the two-axial objective lens actuator shown in FIG. 3.

FIG. 3 is a top view showing the two-axial objective lens actuator, and FIG. 4 is an explored view showing a main portion of the two-axial objective lens actuator. Since the two-axial objective lens actuators 143 and 153 shown in FIG. 2 are entirely identical in structure with each other, the two-axial objective lens actuator 143 in the first optical head moving section 107 will be described in this specification.

The two-axial objective lens actuator 143 includes an objective lens holder 202 which is pentagonal in plan shape and has a square opening 201 disposed in its center portion. A focus coil 204 to one surface of which a pair of tracking coils 203 are fitted is stuck to an inner wall of the opening portion 202, and the objective lens 142 is fitted to a cylindrical hole 206 which is opened in the vicinity of a substantially V-shaped projected portion of the pentagon. The objective lens holder 202 thus structured is fitted into a magnetic circuit 209 consisting of a magnetic yoke 208 which is U-shaped, where electromagnetic drive is conducted. Namely, the optically axial direction of the objective lens holder 202 is a focusing (F) direction, and a direction orthogonal to the focusing direction and right-angled to a straight line connecting the center of the objective lens holder 202 and the cylindrical hole 206 is a tracking (T) direction.

An end portion of the objective lens holder 202 on an opposite side of a side where the hole 206 is defined is projected so as to form a projection 211. The projection 211 opposes to a light emitting diode 215 disposed on a wall portion 214 standing on one end of an actuator base 212 to which the bottom of the magnetic yoke 208 is fixed. The wall portion 214 may be integrally molded with the actuator base 212. A pair of photo sensors 216 are disposed on both sides of the light emitting diode 215 in the wall portion 214. A state in which a light beam emitted from the light emitting diode 215 is received by those photo sensors 216 depends on the position of the projection 211. Namely, the movement in the radical direction of the optical disc 101 (FIGS. 1 and 2), that is, in the tracking (T) direction by the tracking operation is detected by the output of those paired photo sensors 216.

Figure 5:
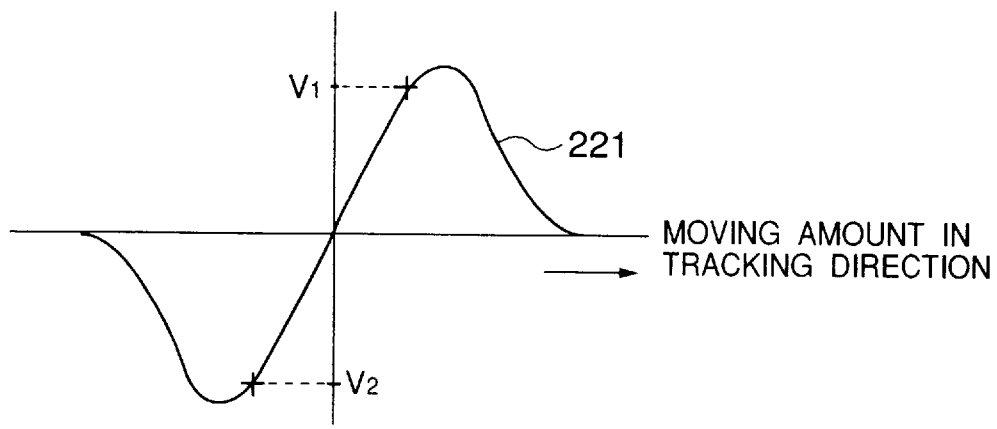
FIG. 5 is a graph representing a relation between the movement amount (mm) of an objective lens holder in the radius direction of the optical disc and the output voltage (V) of paired optical sensors.

FIG. 5 is a graph representing a relation between the movement amount (mm) of the objective lens holder in the radius direction of the optical disc and the output voltage (V) of the paired optical sensors. In this example, one output of the paired photo sensors 216 shown in FIG. 3 is in a positive direction whereas the other output is in a negative direction to provide a differential output. A voltage slightly lower than a peak of a curve 221 representing the output voltage in the positive direction is set as an upper limit voltage $V_1$, and similarly a voltage slightly higher than a peak of a curve 221 representing the output voltage in the negative direction is set as a lower limit voltage $V_1$. With such setting, the moving range is limited so that the objective lens 202 is moved in the voltage range which is smaller than the absolute values of the voltages $V_1$ and $V_2$.

Figure 6:
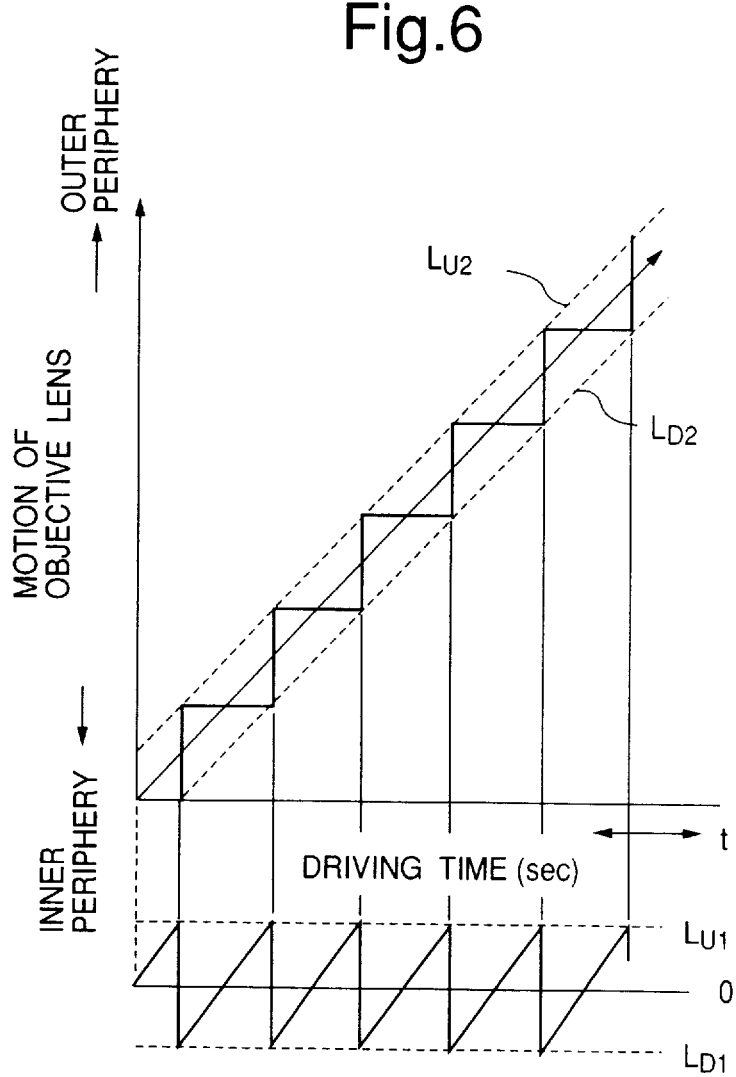
FIG. 6 is a graph representing a relation between a time elapse and the positional displacement of the objective lens as well as the positional change of the objective lens holder when the optical head moves from the inner periphery toward the outer periphery.

FIG. 6 is a graph representing a relation between a time elapse and the positional displacement of the objective lens, as well as the positional change of the objective lens holder when the optical head moves from the inner periphery toward the output periphery. When the optical head 104 shown in FIG. 1 moves from the inner periphery of the optical disc 101 (FIGS. 1 and 2) toward the outer periphery thereof, the objective lens holders 202 installed in the two-axial objective lens actuators 143 and 153 shown in FIG. 2, respectively, are repeatedly moved between its upper limit $L_{U1}$ and its lower limit $L_{D1}$, and while the objective lenses 142 and 152 are moving between the upper limit $L_{U2}$ and the lower limit $L_{D2}$ within a range limited by the above voltages $V_1$ and $V_2$, their positions gradually move from the inner periphery of the optical disc 101 toward the outer periphery thereof. Namely, in moving the objective lenses 142 and 152, the moving ranges of the two-axial objective lens actuators 143 and 153 are detected by the pair of sensors 216, and when their output voltage exceeds the upper limit voltage $V_1$ shown in FIG. 5, the drive motor 123 is controlled in such a manner that the moving table 106, that is, the actuator base 212 moves under control. When a plurality of optical head moving sections 107 and 108 are fitted to one moving table 106 so as to be moved integrally as in this embodiment, a signal for movement of the moving table 106 can be produced on the basis of a tracking error signal for one optical head moving section 107 or 108.

Figure 7:
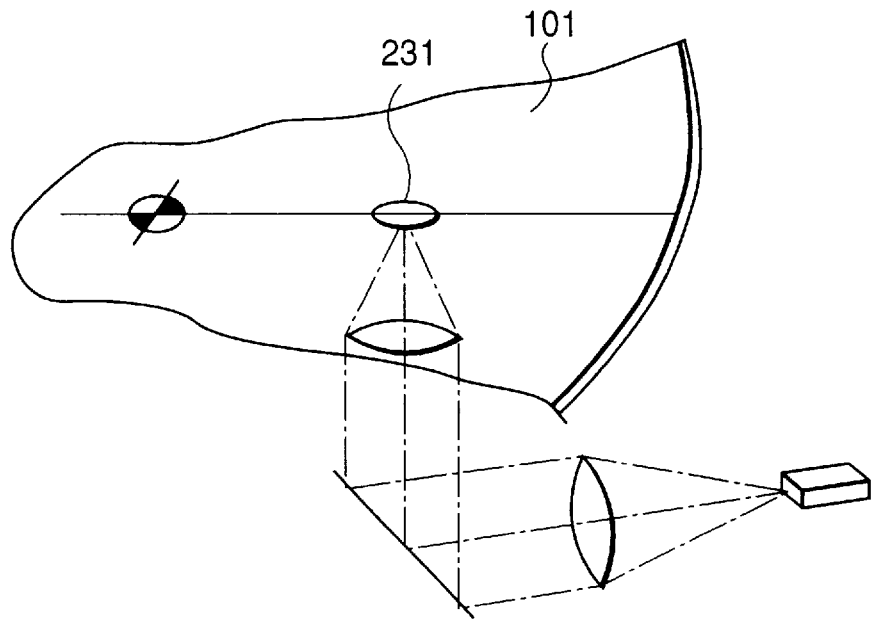
FIG. 7 shows a state in which the device of the embodiment is erasing information in a track on the optical disc.

FIG. 7 shows a state in which the device of this embodiment is erasing information in the track on the optical disc. In this example, a laser of the gain waveguide type is used without using a laser of the refractive waveguide type. Then, a focused beam 231 is formed which has a long axis in the radius direction of the optical disc 101 so that 20 or more tracks can be erased at once.

Figure 8:
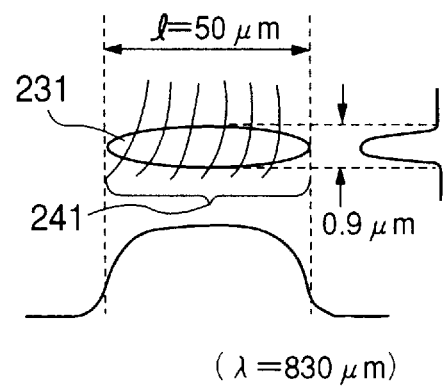
FIG. 8 is a diagram showing a shape of a focused beam of 830 μm wavelength and its output distribution.
Figure 9:
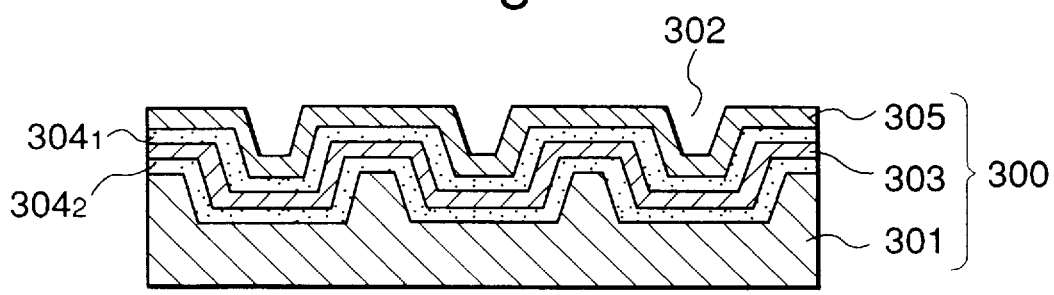
FIG. 9 shows the cross-sectional structure of a conventional magneto-optical optical disc as a magneto-optical medium.
Figure 10:
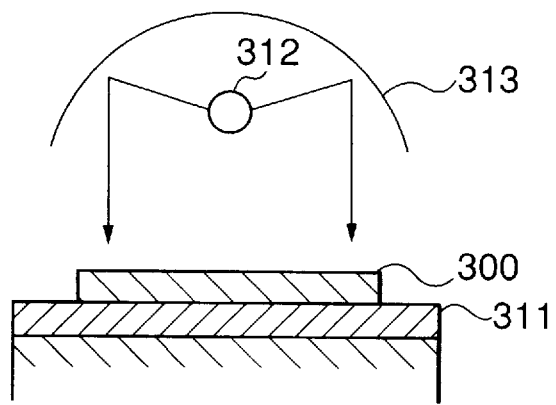
FIG. 10 is a diagram for showing the principle for initializing a magneto-optical optical disc shown in FIG. 9.
Figure 11:
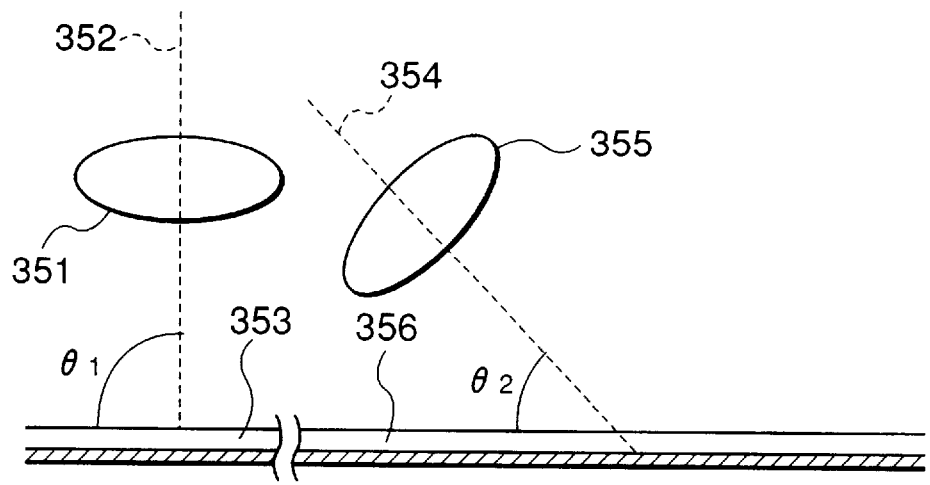
FIG. 11 shows a conventional device for initializing an optical disc, which has been proposed to improve the efficiency of initialization.
Figure 12:
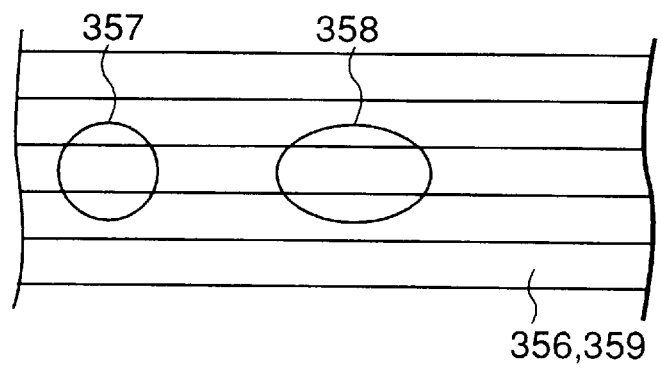
FIG. 12 shows shapes of the normal incident beam and the obliquely inclined incident beam shown in FIG. 11, which have been irradiated on a disc surface.
Figure 13:
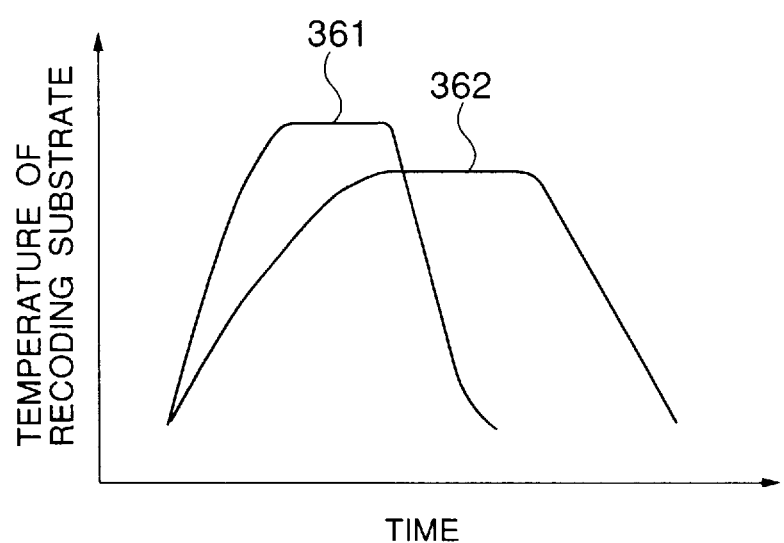
FIG. 13 shows temperature rising characteristics of the normal incident beam and the inclined incident beam.

FIG. 8 is a diagram showing the shape of the focused beam of 830 nm wavelength and the output distribution. The length of the focused beam 231 is 50 $\mu$m or longer in the radius direction of the optical disc 101. For that reason, 20 or more tracks 241 can be erased by a predetermined power at once. Assuming that the number of the tracks 241 which can be erased at once is 20 tracks, 19 tracks can be jumped in the radius direction every time the optical disc 101 (FIG. 7) makes one rotation. This operation can be realized by control of the movement in the radius direction of the optical disc made by the first hologram optical head unit 144 (FIG. 2) that enables accurate tracking operation by the dichroic mirror 141 (FIG. 2). The timing setting of tracking for jumping 19 tracks in the radius direction can be made, for example, by using a pulse timing outputted from an encoder detecting the rotation of a disc motor.

As was described above, according to the present invention, since relatively large spots such as oval spots with a larger diameter in the radius direction of the optical disc or circular spots relatively large in diameter are irradiated onto a plurality of positions of the optical disc simultaneously, and the erasing beams are jumped by a predetermined number of tracks in the radius direction of the optical disc for conducting an erasing operation, the magnet-optical optical disc or the phase change optical disc can be initialized stably and at a high speed.

According to the second aspect of the present invention, the plurality of erasing beam irradiating means comprises a common and single light source of the refractive waveguide type or the gain waveguide type which is positionally fixed for irradiating the erasing beam; and beam branching means disposed on the moving means for branching a laser beam irradiated from the laser light source to irradiate branched laser beams onto the optical disc radically at given intervals. Namely, in the second aspect of the present invention, the laser light source of the plurality of erasing beam irradiating means is used commonly for downsizing the device and lowering the costs.

According to the third aspect of the present invention, each of the erasing beam irradiating means comprises an objective lens through which the erasing beam is irradiated onto the optical disc, and a two-axial objective lens actuator that moves the objective lens in the radius direction of the optical disc and in the optical-axial direction of the objective lens. Also, the multi-tracking control means allows a beam different in wavelength from the erasing beam to be irradiated onto the optical disc through the objective lens, on the base of which a focusing error signal relating to a focal point of the erasing beam that has passed through the objective lens, and a tracking error signal relating to the tracks of the optical disc are obtained, and advances the moving means in the radius direction of the optical disc by a plurality of tracks, the maximum number of which is the number of tracks whose information data are erased at once by the erasing beam irradiating means, while adjusting focusing operation and tracking operation. Namely, in the third aspect of the present invention, the objective lens is so designed as to be movable in the predetermined direction by the two-axial objective actuator, and the beam different in wavelength from the erasing beam is irradiated onto the optical disc through the objective lens. Using the tracking error signal obtained by irradiation of the beam on the optical disc, the moving means is advanced in the radius direction of the optical disc by a plurality of tracks, the maximum number of which is the number of tracks whose information data are erased at once by the erasing beam irradiating means. With thus making the beam different in wavelength from the erasing beam, a false detection of a signal can be prevented, thereby being capable of enhancing the reliability of the device.

According to the fourth aspect added to the third aspect of the present invention, in the respective two-axial objective lens actuators, movable ranges of the objective lens in the radius direction of the optical disc are set and the moving means moves the plurality of erasing beam irradiating means in the radius direction of the optical disc when the moving amount of the objective lens in the two-axial objective lens actuator exceeds the movable ranges. Thus, the control of the radius direction movement of the objective lens in the two-axial objective lens actuator is conducted in associated with the movement of the plurality of erasing beam irradiating means. With this arrangement, more accurate and more rapid control can be performed.

According to the fifth aspect added to the third or fourth aspect of the present invention, the objective lens actuator comprises; a holder for holding the objective lens; a reflector shaped in an projection or the like which moves in association with the movement of the holder; light emitting means such as a light emitting diode which is disposed opposite to the reflector for irradiating a light onto the reflector; a pair of photo sensors such as photodiodes which are disposed on both sides of the light emitting means for receiving the light reflected from the reflector, respectively; differential output means such as a differential amplifier for taking a difference between outputs of those two photo sensors; and detecting means for detecting the movement of the holder in the radius direction of the optical disc on the basis of an output of the differential output means. Using a phenomenon that a light incident to one of the photo sensors increases and a light incident to the other decreases with the movement of the holder, the position of the objective lens is specified by a simple mechanism.

According to a sixth aspect added to the fifth aspect of the present invention, the multi-tracking control means is so designed that a predetermined number of tracks are jumped at once when the erasing beam irradiating means is moved in radius direction; the objective lens actuator is jumped toward a subject track, and at the time of this movement, the movement amount of the holder is detected, and when the movement of the holder exceeds an upper limit of a predetermined displacement, the erasing beam irradiating means is moved. With this associated action, the movement with a high accuracy can be realized.

What is claimed is:

1. A device for initializing an optical disc, comprising:

a plurality of erasing beam irradiating means for irradiating an erasing beam onto a plurality of tracks at different positions on the optical disc simultaneously to erase information written in said plurality of tracks at once;

moving means for moving said plurality of erasing beam irradiating means in a radius direction of the optical disc under a condition where erasing beams irradiated from said plurality of erasing beam irradiating means are irradiated onto the optical disc at given intervals; and control means for controlling said moving means to move said plurality of erasing beam irradiating means by a plurality of tracks.

2. A device for initializing the optical disc as claimed in claim 1, wherein the maximum number of said plurality of tracks is the number of tracks that are erased at once by said erasing beam irradiating means.

3. A device for initializing the optical disc as claimed in claim 1, wherein said plurality of erasing beam irradiating means comprises a single light source for irradiating a laser beam; and beam branching means for branching said laser beam emitted from the laser light source to produce said erasing beam.

4. A device for initializing the optical disc as claimed in claim 1, wherein said erasing beam irradiating means comprises an objective lens through which the erasing beam is irradiated onto the optical disc, and a two-axial objective lens actuator that moves the objective lens in a radius direction of the optical disc and in a optical-axial direction of the objective lens; and wherein control means allows a beam different in wavelength from the erasing beam to be irradiated onto the optical disc through the objective lens to produce a focusing error signal and a tracking error signal, and controls said moving means to move said plurality of erasing beam irradiating means in a radius direction of the optical disc by a plurality of tracks, the maximum number of which is the number of tracks whose information is erased at once by said erasing beam irradiating means, while adjusting focusing operation and tracking operation.

5. A device for initializing the optical disc as claimed in claim 4, wherein a predetermined movable range of the objective lens in the radius direction of the optical disc in said two-axial objective lens actuator is set and said moving means moves said plurality of erasing beam irradiating means when a moving amount of said objective lens in said two-axial objective lens actuator exceeds said movable range.

6. A device for initializing the optical disc as claimed in claim 4, wherein said two-axial objective lens actuator comprises: a holder for holding the objective lens; a reflector which moves in association with the movement of the holder; light emitting means disposed opposite to the reflector for irradiating a light onto the reflector; a pair of photo sensors disposed on both sides of said light emitting means for receiving the light reflected from the reflector, respectively; differential output means for taking a difference between outputs of those two photo sensors; and detecting means for detecting the movement of the holder in the radius direction of the optical disc on the basis of an output of said differential output means.

7. A device for initializing the optical disc as claimed in claim 6, wherein said control means is so designed that said objective lens actuator is jumped toward a subject track, and at the time of this movement, the movement of said holder is detected, and when the movement of the holder exceeds a predetermined limit, said moving means moves said erasing beam irradiating means.

* * * * *